US005483651A

United States Patent [19]
Adams et al.

[11] Patent Number: 5,483,651
[45] Date of Patent: Jan. 9, 1996

[54] GENERATING A DYNAMIC INDEX FOR A FILE OF USER CREATABLE CELLS

[75] Inventors: Jayson L. Adams, Menlo Park; R. Scott Love, Palo Alto, both of Calif.

[73] Assignee: Millennium Software, Menlo Park, Calif.

[21] Appl. No.: 162,489

[22] Filed: Dec. 3, 1993

[51] Int. Cl.$^6$ .............................. G06F 17/30; G06F 17/24
[52] U.S. Cl. .................... 395/600; 395/159; 364/419.07; 364/419.11; 364/419.19; 364/974; 364/974.3; 364/943.1; 364/927; 364/225.6; 364/254.9; 364/282.1; 364/282.3; 364/DIG. 1; 364/DIG. 2
[58] Field of Search ..................................... 395/600, 425; 364/419.07, 419.11, 419.19

[56] References Cited

U.S. PATENT DOCUMENTS 5,347,295  9/1994  Agulnick et al. .................. 345/156
5,367,624  11/1994  Cooper .............................. 395/151
5,408,470  4/1995  Rothrock et al. .................. 370/62

*Primary Examiner*—Thomas G. Black
*Assistant Examiner*—Paul R. Lintz
*Attorney, Agent, or Firm*—Judson D. Cary; Amir H. Raubvogel

[57] ABSTRACT

A system and method of automatically indexing information to allow a user to view "cross sections" of the information as desired. Information in a document is divided into "cells". As the user adds or changes information in cells of a document, the system updates one or more indexes to reflect the new contents of the document. Thus, indexes are generated and maintained, using a variety of index criteria, without any user effort or intervention. Index criteria may include cell contents of data elements as well as cell attributes. The user may view indexes by means of special index pages that form part of the document. Cells in the index pages are linked to other cells within the document so that a user may access any document cell directly from the index, as desired.

27 Claims, 14 Drawing Sheets

GENERATING A DYNAMIC INDEX FOR A FILE OF USER CREATABLE CELLS

BACKGROUND OF THE INVENTION

1. Field of the Invention

This invention relates to information processing software applications, and more particularly to a system and method of generating and displaying dynamic index views of information stored in a document.

2. Description of the Related Art

Computers are increasingly being used to store and manipulate very large and diverse masses of information. As the power, speed, and storage capacity of computer hardware increase, the amount of information that is available to users continues to grow, requiring more and more effort to organize and manage. In addition, the proliferation of high-speed local-area- and wide-area-networks has increased the amount of information flow among computer users. Consequently, the task of providing effective and efficient access to a particular desired piece of data becomes more difficult.

Much of the information that is becoming available on computer systems is unstructured and therefore difficult to organize, process, and retrieve. Unstructured information can be defined to include electronic mail messages, application files and documents, user generated free-form text, streams of information packets in news feeds, and the like. In particular, electronic mail systems have grown more sophisticated, giving rise to more complex and diverse messages that can include file attachments, charts, graphs, voice annotations, and other forms of multi-media information. Modern operating systems such as NeXTSTEP allow even richer data environments, allowing applications to communicate with one another, resulting in even more instances of unstructured and highly varied pieces of information.

Application programs that allow users to organize information are known. Outline processors permit users to organize textual data in a hierarchical outline format, hide or show information to various levels as needed, easily reorganize pieces of information by clicking and dragging with an input device such as a mouse, and create various types of graphical displays based on the contents of outlines. Contact managers and to-do managers provide tools for organizing and keeping track of business contacts and tasks to be performed. These and other commercially-available software products help users apply a structure or organizational template to essentially unstructured information, thus facilitating later access and retrieval as needed. However, in all of these applications, users must expend some effort when entering information, thinking about the structure being applied and how the information fits into that structure. This effort may not be insubstantial, as users are forced to consider possible retrieval strategies and modes whenever they enter new data.

What is needed, then, is a technique that allows information entry with very little user effort, yet provides flexible and powerful retrieval tools that apply structure as needed, automatically, and in a useful manner.

SUMMARY OF THE INVENTION

In accordance with the present invention, there is provided a system and method of automatically indexing information, allowing a user to view "cross sections" of the information as desired. As the user adds or changes information in a document, the system updates one or more indexes to reflect the new contents of the document. Thus, indexes are generated and maintained, using a variety of index criteria, without any user effort or intervention.

Information in a document is divided into "cells". Each cell may contain text, images, links to documents, and other types of information. In addition, each cell has a number of attributes that are automatically created and updated by the system. Data may be indexed by cell contents as well as by attributes. The user may view indexes by means of special index pages that form part of the document. Cells in the index pages are linked to other cells within the document, so that a user may access any document cell directly from the index, as desired.

By creating and maintaining indexes, the system and method of the present invention provide a way for the user to locate information based on what the user happens to remember about it. The user may remember the date on which a cell was added, or a particular name that appears in a cell, or a particular attachment for a cell. The invention allows the user to employ his or her natural aptitude for recall memory by association in order to find information in an efficient manner.

DESCRIPTION OF THE PREFERRED EMBODIMENT

Figure 1:
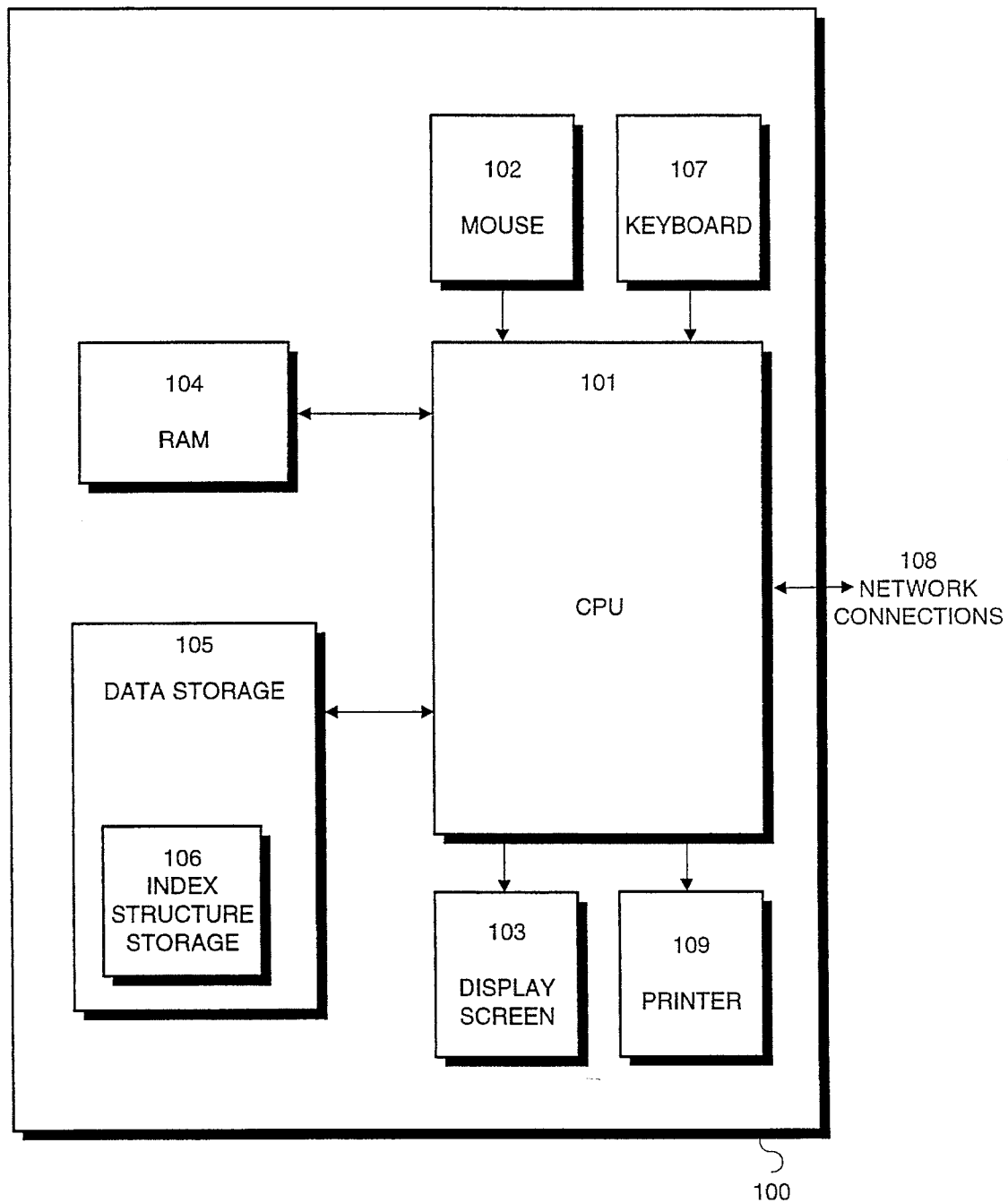
FIG. 1 is a block diagram of a system configuration for the present invention.

Referring now to FIG. 1, there is shown a system configuration for a preferred embodiment of the present invention. A computer 100 includes a central processing unit (CPU) 101, mouse 102, keyboard 107, display screen 103 and printer 109 that operate in a conventional manner. Other input and/or output devices may also be provided. Also included is random-access memory (RAM) 104 which acts as a workspace for data and application code, in a conventional manner. CPU 101 performs the steps of the process, described below, in accordance with program instructions held in RAM 104, in a manner that is conventional with regard to application software packages. If desired, multiple CPUs may be used. Data storage 105 may be a conventional disk drive or other storage device for containing large amounts of data as described herein. Data storage 105 includes index structure storage 106 for storing various index structures as described below. In addition, system 100 may include connections to other computers, via a local-area-network and/or a wide-area-network, for accepting input and presenting output in a conventional manner.

System 100 may be implemented on any general purpose computer or computing device, such as, for example, a NeXT computer running the NeXTSTEP 2.0 operating system, with keyboard 107, mouse 102, and display screen 103. In the preferred embodiment, system 100 creates files called "Notebooks" stored in data storage 105.

Figure 2:
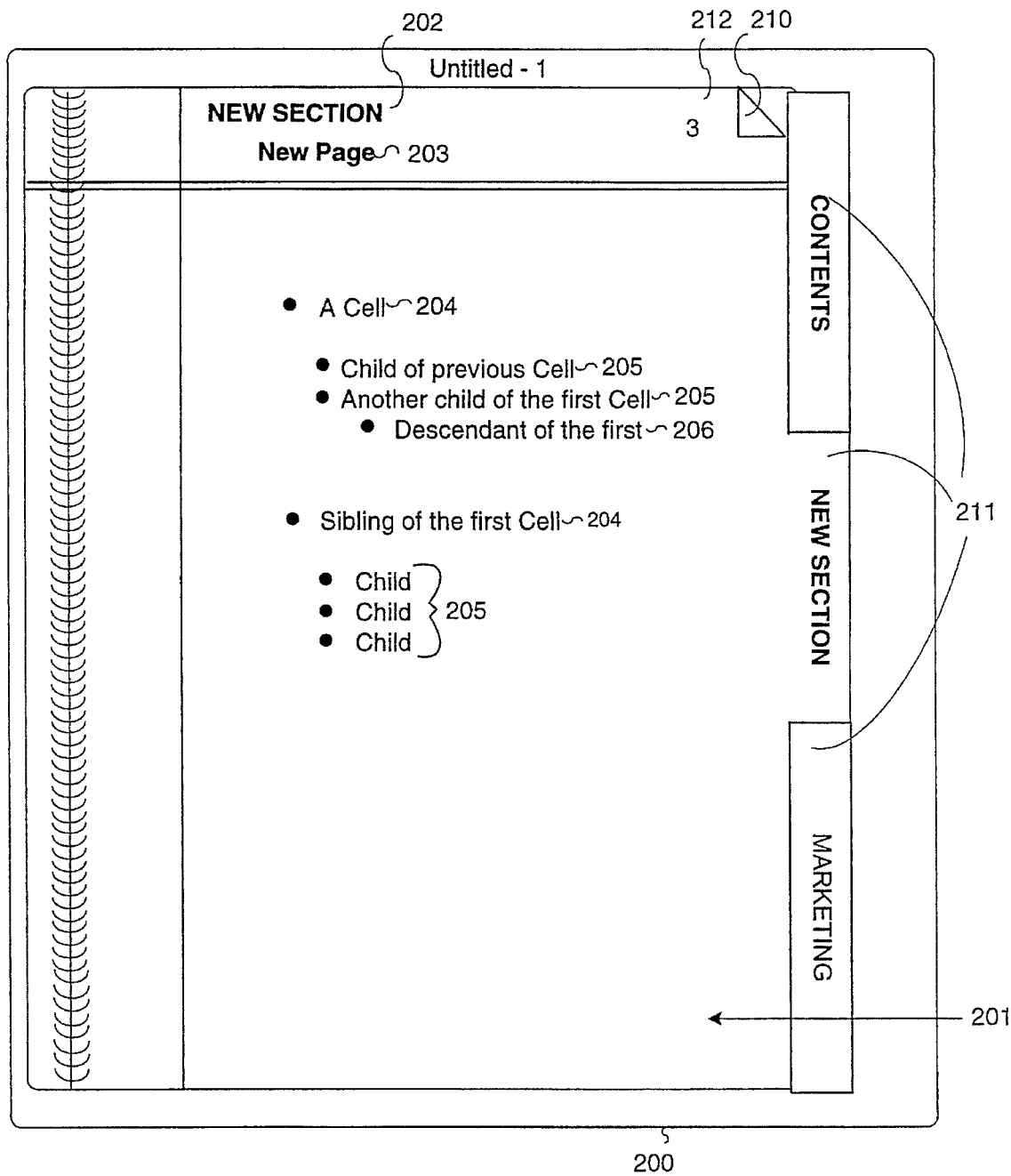
FIG. 2 is an example of an on-screen window including a page from a notebook file.

Referring now to FIG. 2, there is shown an example of a window 200, containing a page 201 from a notebook file as it appears on display screen 103. A notebook file is a metaphor for a real-life notebook. It contains a collection of pages 201 grouped into different sections. Any number of sections and pages may be created, as desired by the user. Various on-screen tools, such a page numbers 212, tabs 211, and folded corners 210 are provided to facilitate user navigation through the notebook. A user may click on folded corner 210 to go forward or backward one page, or may click on a tab 211 to move immediately to another Page associated with the selected tab 211.

Page 201 also includes section title 202 indicating the title of the current section of the notebook, and page title 203 indicating the title of the current page 201 of the notebook. The user can freely assign titles 202 and 203 as desired in a conventional manner.

Page 201 contains text, files, images, and other types of information. The user can place information into page 201 by creating cells 204–206. Cells 204–206 are the basic units of information in the notebook. Each cell 204-206 can contain data, and also has a set of attributes that may be maintained automatically by system 100, as will be described in more detail below. A conventional data structure in data storage 105 stores cell information and attributes. Cells 204–206 are organized hierarchically, as in a conventional out-line processor. Thus, in the example of FIG. 2, cells 204 are parent (level 1) cells, cells 205 are child (level 2) cells and cell 206 is a child (level 3) cell. Each child cell 205 and 206 is a child of the cell immediately above it in the hierarchy. This hierarchical organization scheme facilitates organization and movement of cells 204–206 on page 201 and throughout the notebook. As with conventional outline processors, the user can move cells 204–206 on the display by dragging with mouse 102. The user can also delete or hide cells 204–206 by invoking commands. When a parent cell 204 is moved, deleted, or hidden, its child cells 205–206 are correspondingly affected in a conventional manner.

Figure 3:
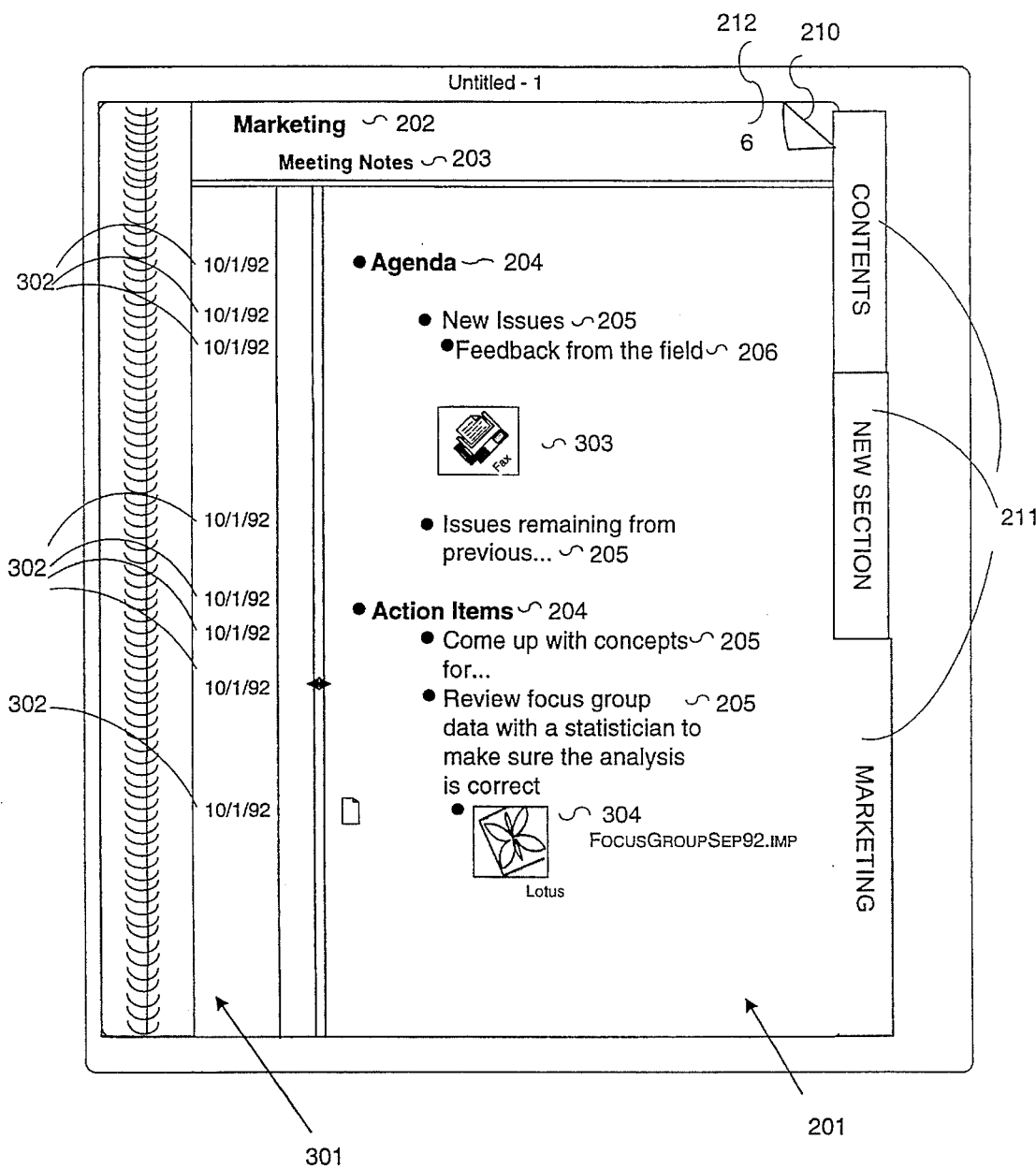
FIG. 3 is an example of an on-screen window including a page displaying an attribute column.

A set of attributes is associated with each cell 204–206. These attributes may be user-configurable, or they may be automatically maintained by system 100. Referring now to FIG. 3, there is shown a page 201 displaying attribute column 301 containing attributes 302. The user may select which of attributes 302 are visible at any given time by invoking the corresponding attribute column 301. In the example shown, the user has invoked an attribute column 301 containing dates. The date shown beside each cell 204–206 indicates the date that cell was added to the notebook. These dates are automatically generated and maintained by system 100. For dates and other automatically maintained attributes, the user may optionally change the values that are automatically generated by system 100. Thus, for example, the date attribute may default to the creation date of the cell, but may then be changed to any other date by the user.

FIG. 3 also illustrates that non-textual data may be stored as part of a notebook. Page 201 contains icons representing a fax 303 and an electronic mail message 304. The user may access fax 303 or message 304 by double-clicking on the associated icon in a conventional manner. When faxes, messages, and other types of data are added to a notebook, the user may specify whether the item is actually copied into the notebook file, or whether a link is established pointing to an external location where the item is stored. This preference is established by the user through an options dialog box in a conventional manner.

Figure 4:
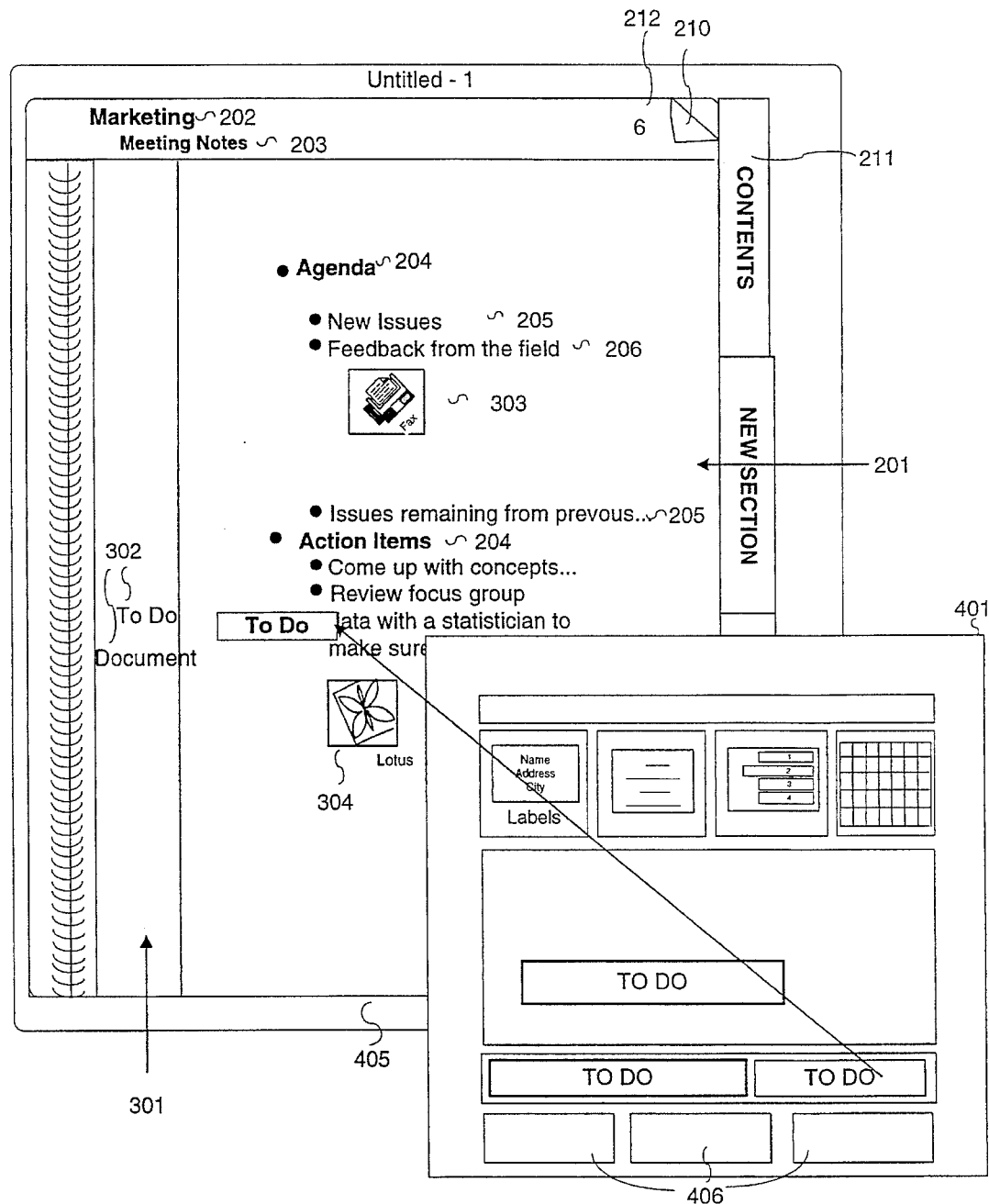
FIG. 4 is an example of an on-screen window including a page displaying an attribute column and a dialog box for selecting and maintaining an attribute.

Referring now to FIG. 4, there is shown an example of a user-configurable attribute. Page 201 is shown with displayed attribute column 301. Here, column 301 contains attributes 302 indicating labels for various cells 204–206 and 304. A label is an attribute 302 that is selected and maintained by the user through dialog box 401. In dialog box 401, the user can select from a list 402 of labels, and drag a selected label 404 to a selected cell for association therewith. Once the selected label 404 has been dragged to a cell 204–206, the selected label 404 appears in attribute column 301. Labels can be of any type. Some examples are shown in label list 402. In addition, the user can remove, add, or modify labels in list 402 using text entry field 405 and buttons 406 in dialog box 401 in a conventional manner.

Figure 5:
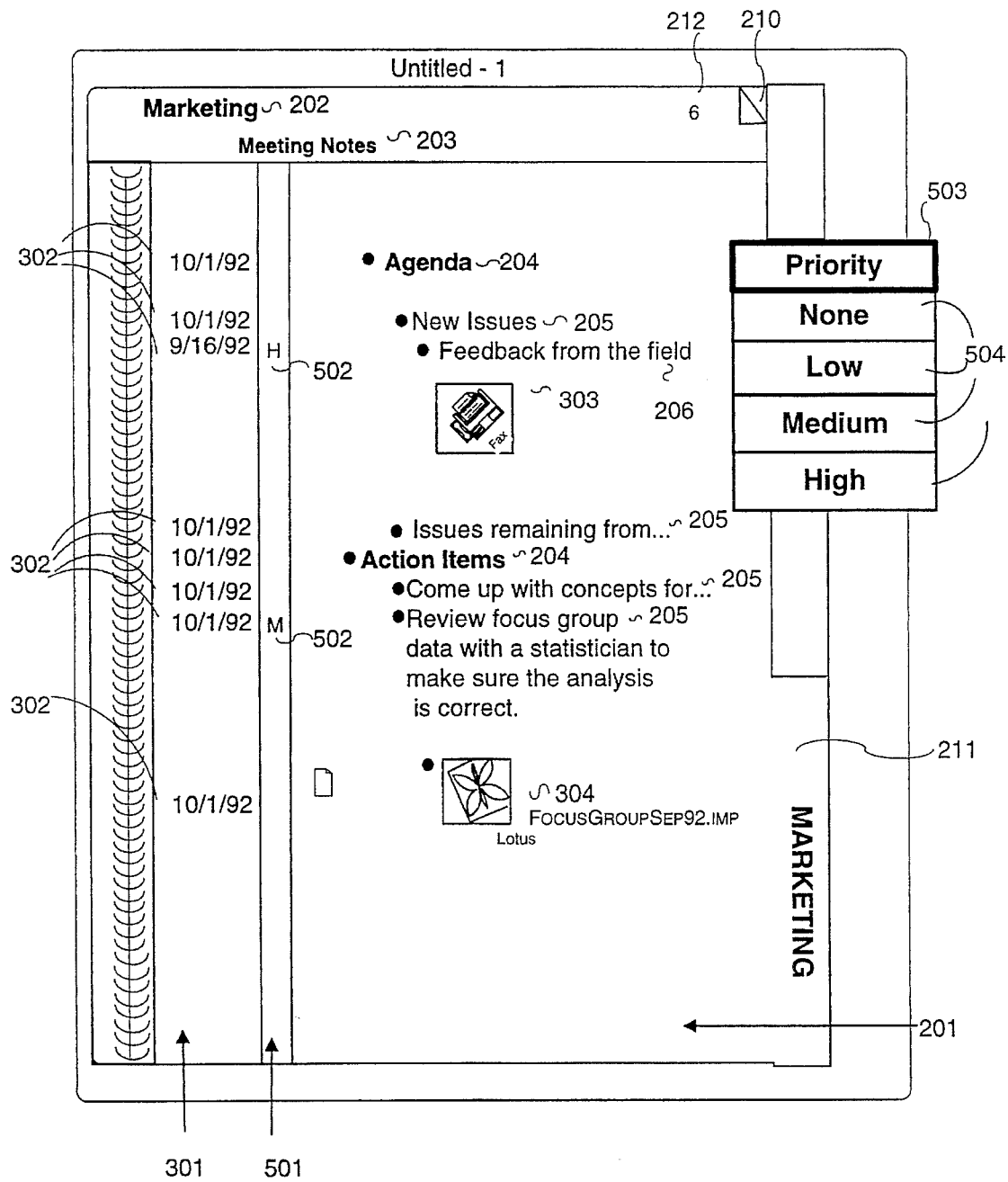
FIG. 5 is an example of an on-screen window including a page displaying an attribute column and a menu for selecting and maintaining an attribute.

Referring now to FIG. 5, there is shown another example of a user-configurable attribute. Page 201 is shown with two displayed attribute columns 301 and 501. Column 301 contains attributes 302 indicating dates; as described above, these represent the dates that each of cells 204–206 were added to the notebook. Column 501 contains attributes 502 indicating priorities for various cells 204–206. A priority is an attribute 502 that is selected and maintained by the user through menu 503 in a conventional manner. In menu 503, the user can select a priority by clicking on one of the buttons 504. In the preferred embodiment, four priority choices are available: "None", "Low", "Medium", or "High". A letter corresponding to the selected priority appears in column 501.

The above descriptions of attributes are presented by way of example only. In the preferred embodiment, attributes include the following: labels, creation dates, last-modification dates, priorities, and user-configurable flags (on-off). Many other attribute types, both automatic and user-configurable, could be employed without departing from the spirit or essential characteristics of the present invention.

Figure 7:
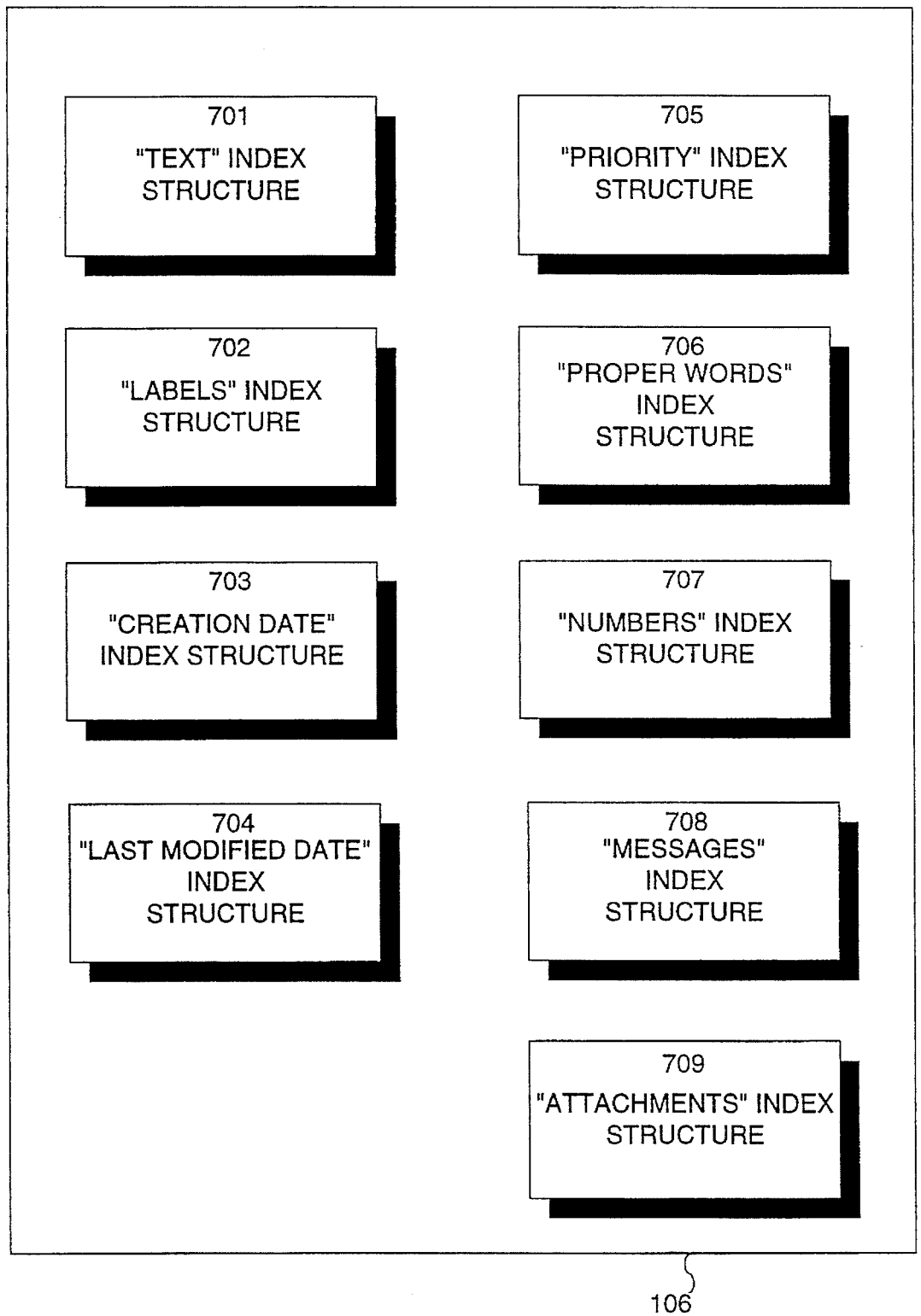
FIG. 7 is a block diagram of index structure storage according to the present invention.

The present invention employs a technique of automated indexing to assist the user in finding information in a notebook. Referring now to FIG. 7, there is shown index structure storage 106. System 100 maintains an index data structure comprising a B-tree database for each of a number of attributes, as well as for text, numbers, proper words (capitalized words), and attachments. Thus, index structure storage 106 contains "text" index structure 701, "labels" index structure 702, "creation date" index structure 703, "last modified date" index structure 704, "priority" index structure 705, "proper words" index structure 706, "numbers" index structure 707, "messages" index structure 708, and "attachments" index structure 709. Other index data structures using a B-tree or any other format may also be provided.

Figure 8:
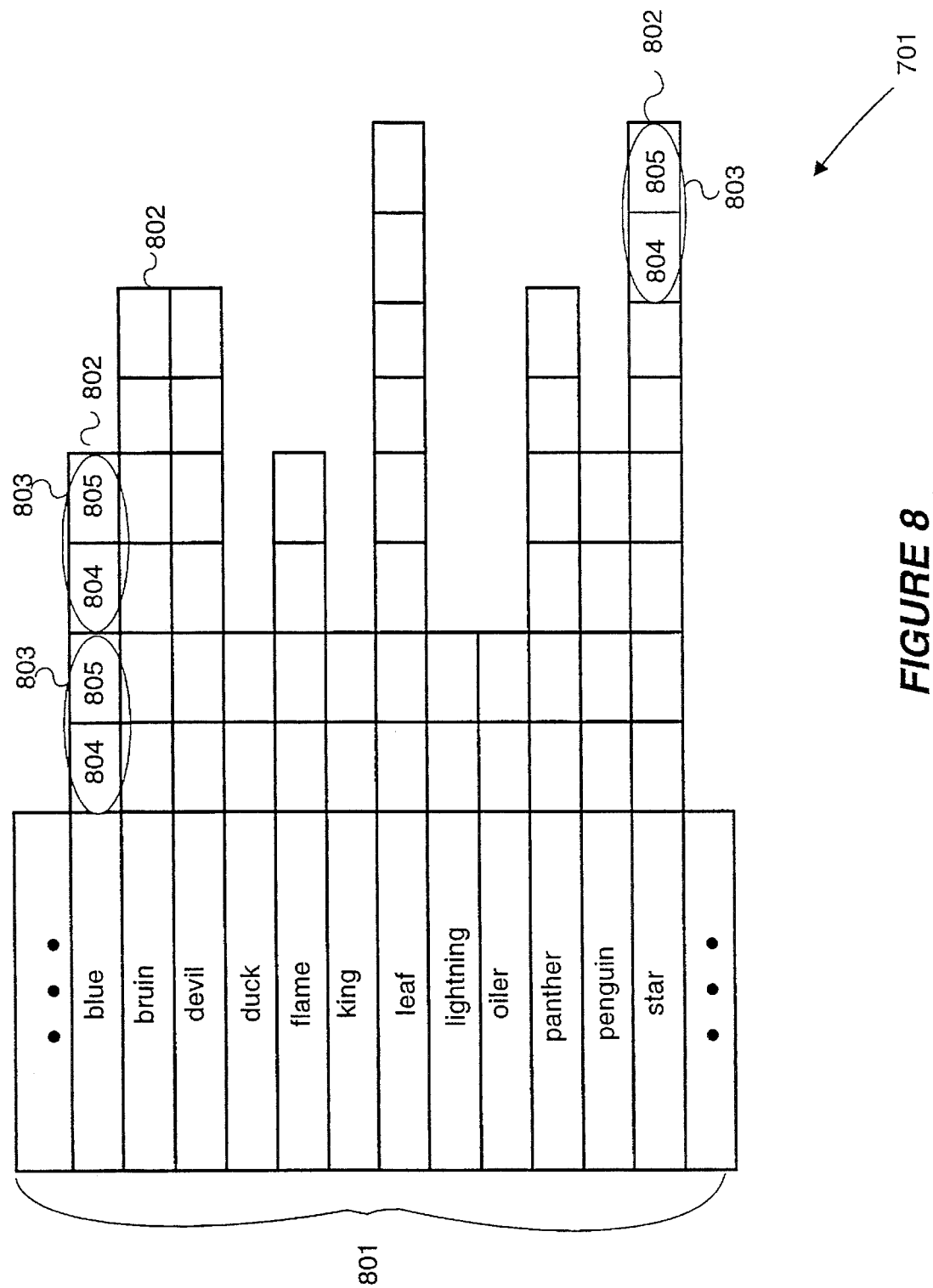
FIG. 8 is a diagram showing an example of a "text" index data structure according to the present invention.

Referring now to FIG. 8, there is shown an example of "text" index data structure 701. A word list 801 is stored, containing each word in the notebook, alphabetically arranged in a conventional B-tree configuration, allowing for quick access to any desired word. It has been found preferable to omit common words, such as "the" and "and", from the word list 801, since users rarely search for such words. A stop-list of such words may be provided, as described below. An occurrence list 802 is provided for each word in word list 801. Occurrence list 802 contains an entry 803 for each appearance of the particular word in the notebook. Each entry 803 contains cell identifier 804 and page identifier 805 specifying the exact location within the notebook of the corresponding appearance of the particular word. Thus, by consulting occurrence list 802 for a desired word in word list 801, system 100 can locate every appearance of the desired word in the notebook.

For other index data structures 702–709, a similar technique is employed. Rather than providing a word list 801, system 100 provides a list that is applicable to the attribute or other feature being indexed. Thus, for example, for "labels" index data structure 702, a labels list is provided, while for "creation date" index data structure 703, a date list is provided. Occurrence lists 802 containing entries 803 are provided for each data structure 702–709 in a similar manner to that described above for data structure 701.

Figure 6:
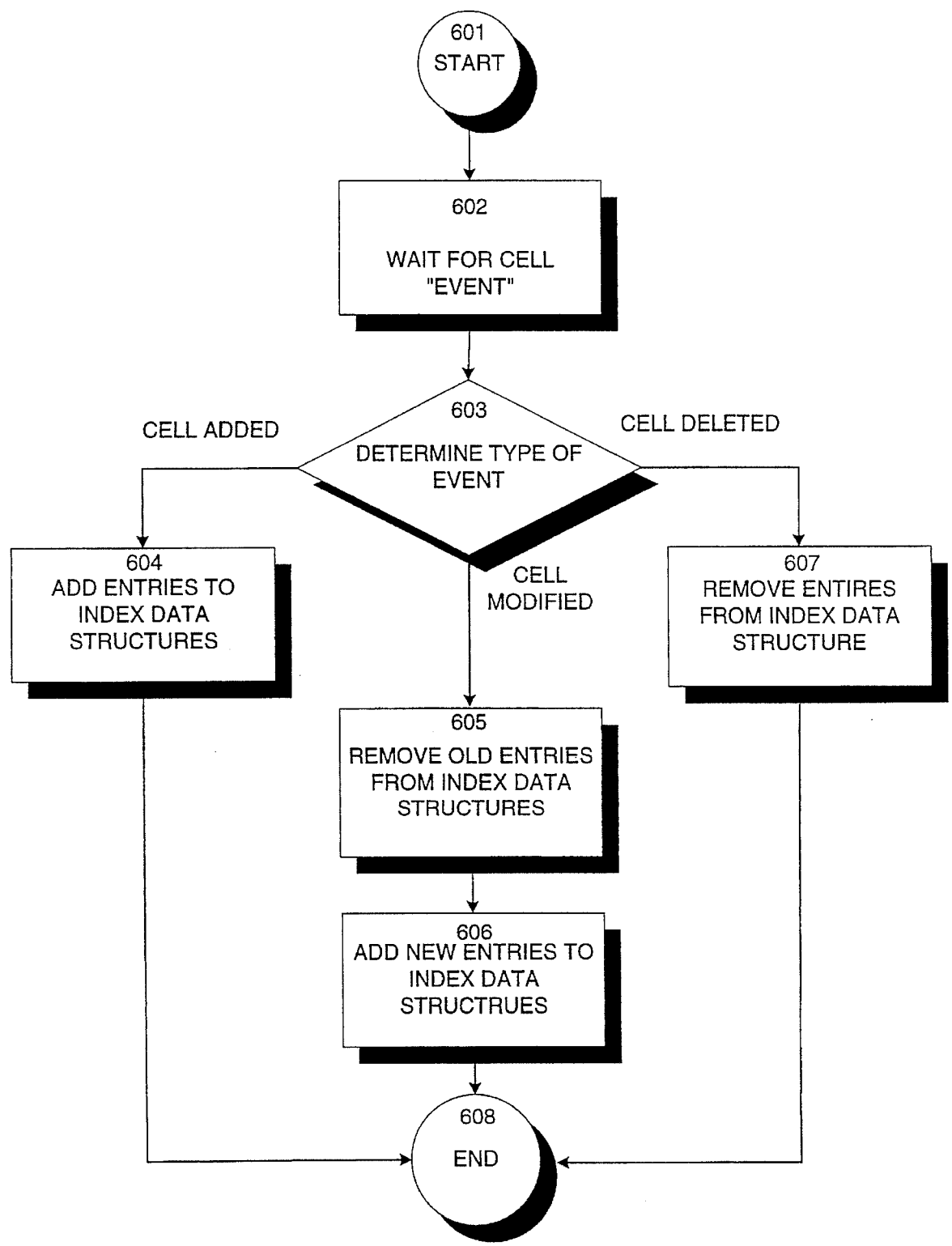
FIG. 6 is a flowchart of an automated indexing process according to the present invention.

Referring now to FIG. 6, there is shown a flowchart of an automated indexing process of the preferred embodiment. As the user adds, modifies, and deletes cells to or from a notebook, system 100 updates index data structures 701–709 accordingly. This occurs whenever a cell "event" takes place. A cell "event" is defined as any addition, deletion, or modification to a cell in the notebook. An event may occur as a result of user action—as when the user signifies the end of an entry or modification by hitting "Enter" or "Return" or clicking on screen 103 outside of the cell being entered or modified, or when the user selects a command for deleting, pasting, duplicating, or modifying a cell. Alternatively, an event may occur as a result of an automatic action—as when a cell is added to a notebook to automatically store incoming data from a news feed. Event processing is well known in the art, and may be accomplished using standard interrupt-driven routines in NeXTSTEP or other operating systems. A conventional input controller may be provided for determining when an event has occurred. System 100 waits 602 for some type of cell event to occur, then determines 603 the type of event once it has occurred. If a cell has been added, entries referencing the cell are added 604 to index data structures 701–709. If a cell has been modified, all entries in all data structures 701–709 referencing the modified cell are removed 605, and new entries referencing the modified cell are added 606. If a cell has been deleted, all entries in all data structures 701–709 referencing the deleted cell are removed 607.

After step 604, 606, or 607 is completed, the process ends 608. Typically, system 100 then returns to step 602 to wait for another cell "event".

Figure 9:
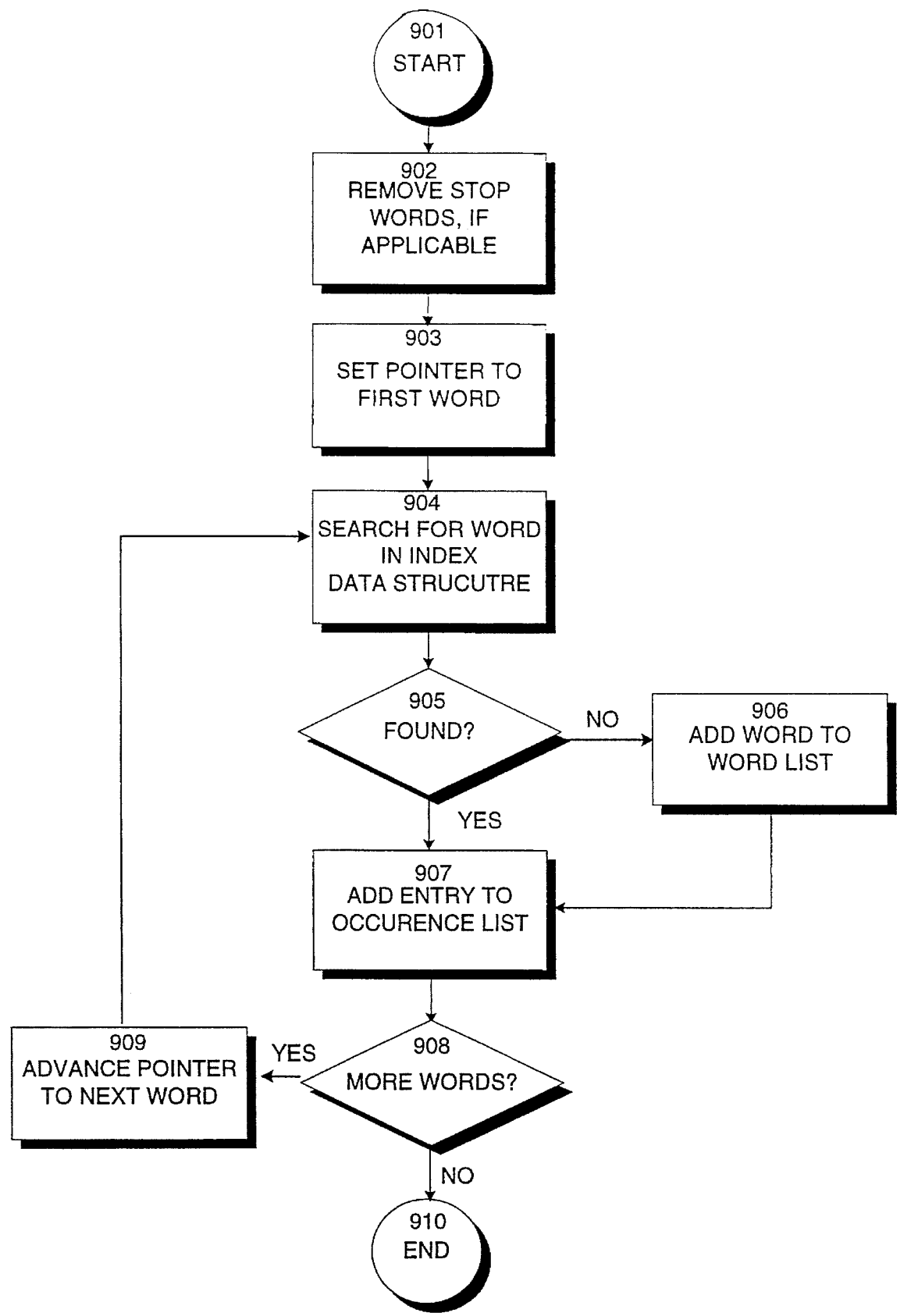
FIG. 9 is a flowchart of a process for adding entries to the "text" index data structure according to the present invention.

When entries are added in steps 604 and 606, entries referencing the cell are added to "text" data structure 701 as shown in FIG. 9. First, stop words are removed 902, if desired. Typically, a stop-list of common words is provided, so that system 100 does not index these words (such as "the" and "and"). Then, a pointer is set 903 to the first word in the cell that is not stop-listed. System searches 904 for the word in "text" index structure 701. If the word is not found, the word is added 906 to word list 801 according to conventional B-tree techniques. Then, a new entry 803 is made 907 in occurrence list 802 for the word. The new entry 803 indicates a cell identifier and page identifier for the cell that has been added or modified. If the word is found in structure 701, system skips step 906 and proceeds directly to step 907. Once the entry has been made, system 100 checks to see if there are more words in the cell that are not stop-listed. If so, it advances 909 the pointer to the next word, and repeats steps 904 to 908. If not, the process is complete.

A process similar to that shown in FIG. 9 is performed for "proper words" data structure 706 and "numbers" data structure 707 whenever entries are added in steps 604 and 606. For "proper words" data structure 706, only capitalized words are considered. For "numbers" data structure 707, only numeric elements of the cell are considered. For "attachments" data structure 709, a similar process is employed in which system 100 considers attachments to the cell, such as files, images, or other items.

Figure 10:
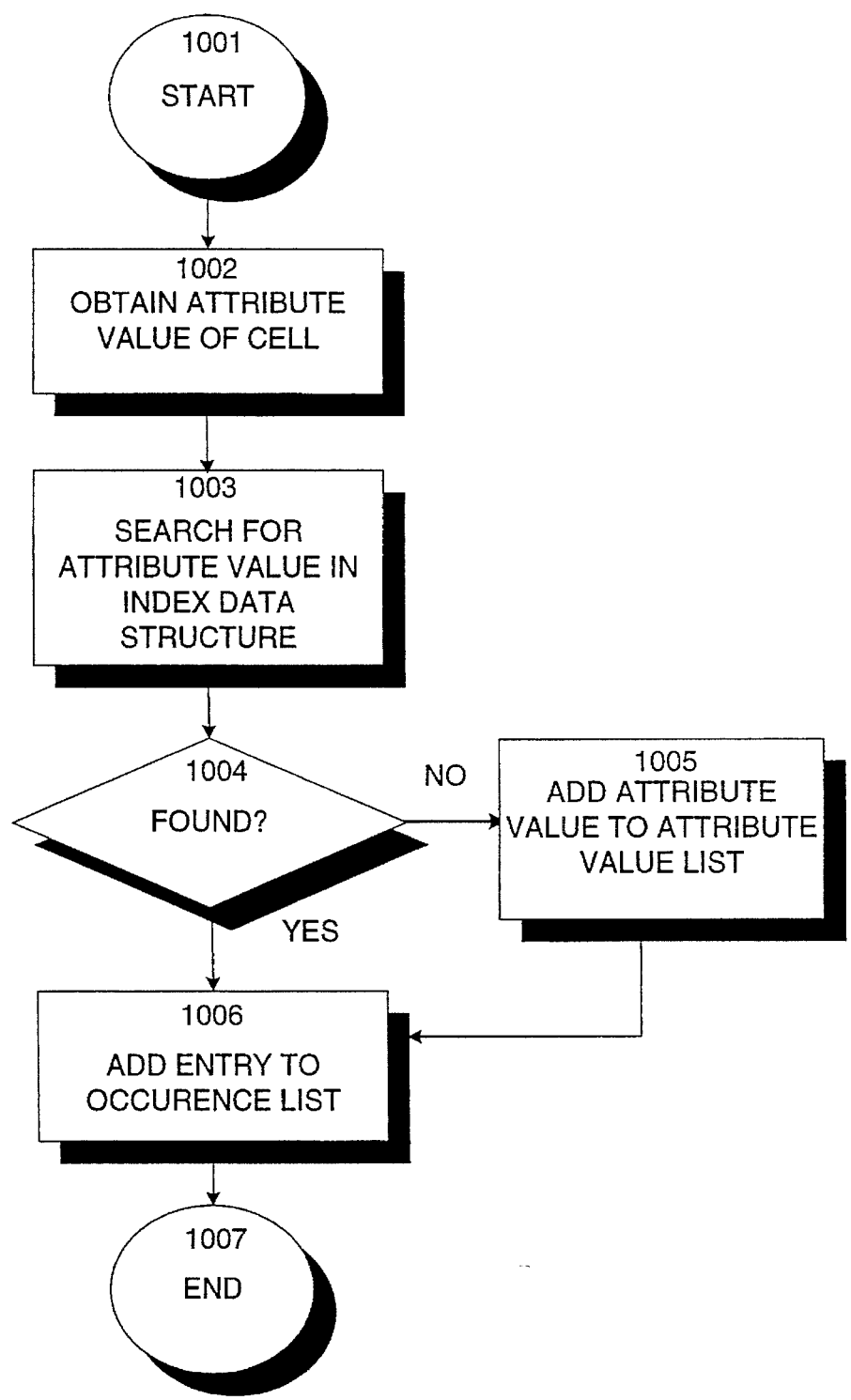
FIG. 10 is a flowchart of a process for adding entries to an attribute index data structure according to the present invention.

For attribute data structures such as "labels" data structure 702, "creation date" data structure 703, "last modification date" data structure 704, "priority" data structure 705, and the like, cells references are added as shown in FIG. 10. System obtains 1002 the value of the attribute for the added or modified cell. Then it searches 1003 for that value in the index data structure corresponding to the attribute. If the value is not found, the attribute value is added 1005 to attribute value list 801 according to conventional B-tree techniques. Then, a new entry 803 is made 1006 in occurrence list 802 for the attribute value. The new entry 803 indicates a cell identifier and page identifier for the cell that has been added or modified. If the value is found in the data structure, system skips step 1005 and proceeds directly to step 1006.

When entries are removed in steps 605 and 607, system 100 searches each data structure 701–709 for an entry corresponding to each word, number, and attribute of the cell, as appropriate. When entries corresponding to the deleted cell are found, they are removed from the data structure.

Thus, data structures 701–709 are maintained in a manner that is invisible to the user. In addition, a command may be provided by which the user can invoke regeneration of all data structures 701–709. Thus, if structures 701–709 become corrupted for some reason, they can be restored by cell-by-cell reconstruction.

By creating and maintaining data structures 701–709, the system and method of the present invention provide a way for the user to locate information based on what he or she happens to remember about it. The user may remember the date on which a cell was added, or a particular name that appears in a cell, or a particular attachment for a cell. Whichever attribute or item the user remembers, system 100 provides an easy way for the user to find the desired cell. This is accomplished as follows.

Figure 11:
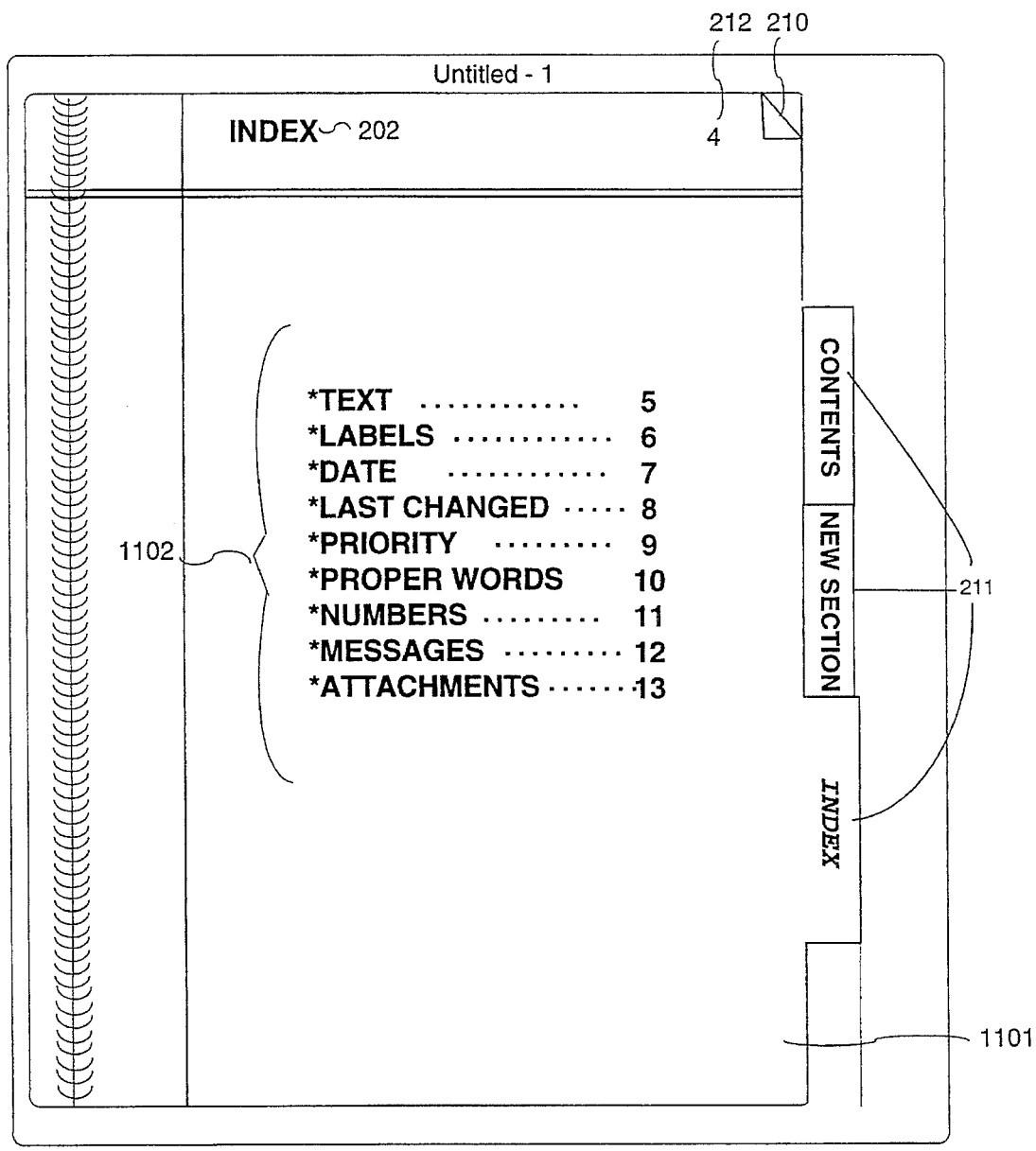
FIG. 11 is an example of an on-screen window including an index section title page according to the present invention.

For each notebook file, an index section and corresponding index section title page may be automatically generated and appended to the notebook by system 100. Referring now to FIG. 11, there is shown index section title page 1101 of a notebook. Page 1101 lists a number of index criteria 1102 corresponding to the various data structures 701–709. If the user positions mouse 102 on one of index criteria 1102 and double-clicks, system 100 displays a page containing an index organized according to the selected index criteria 1102.

Figure 12:
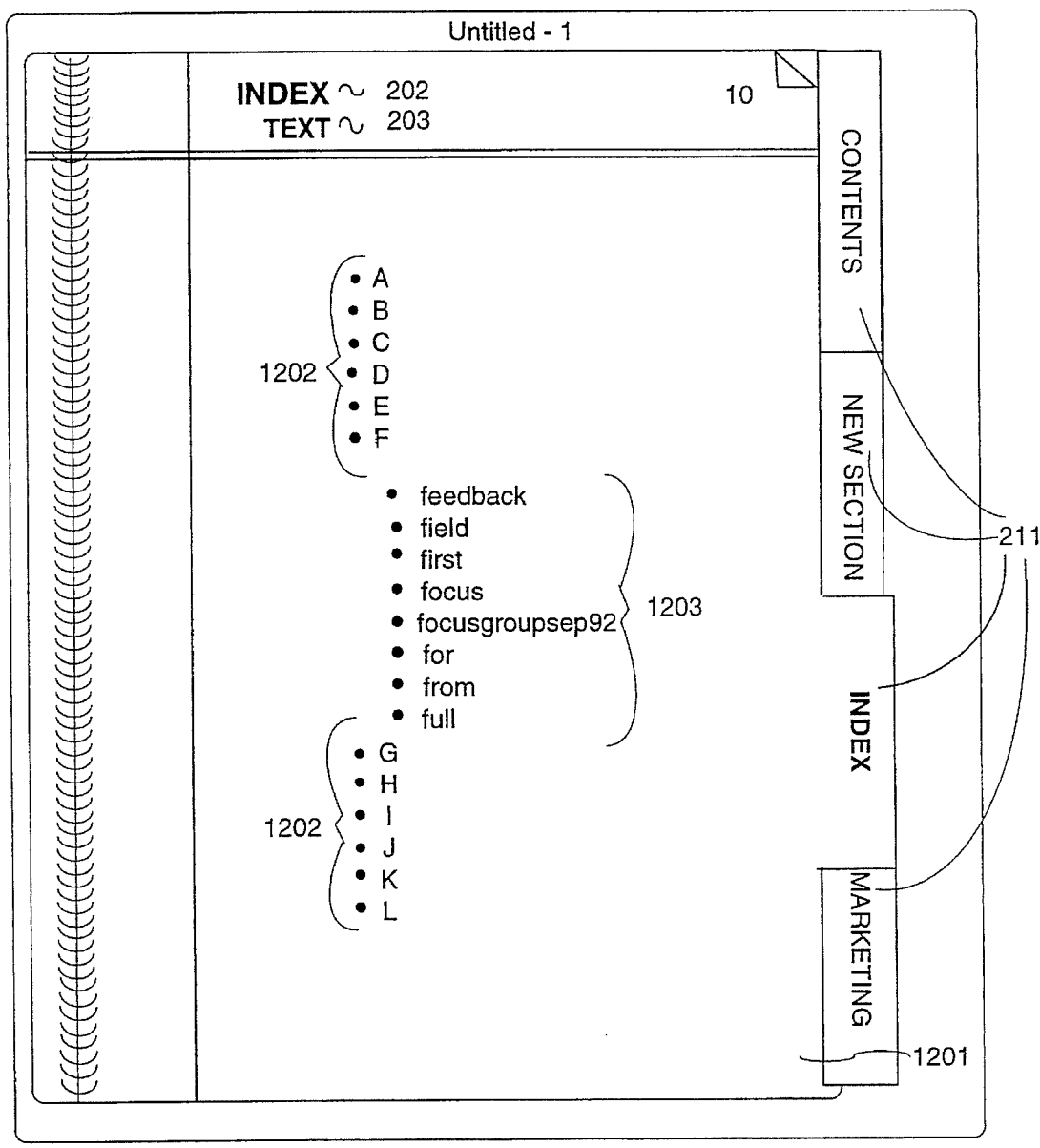
FIG. 12 is an example of an on-screen window including a text index page according to the present invention.

For example, if the user clicks on "Text", system 100 displays page 1201, as shown in FIG. 12. Page 1201 contains letter cells 1202 corresponding to the letters of the alphabet. Double-clicking a letter cell 1202 causes system 100 to display child cells 1203 for that letter cell, which contain all of the words in word list 801 that begin with the selected letter of the alphabet. In the example shown, the user has double-clicked on the letter "F", and system 100 displays eight words from word list 801 of data structure 701, all beginning with the letter "F". The B-tree configuration of data structure 701 facilitates rapid location of all words beginning with a specified letter. Once the user has found a word of interest, he or she can double-click on that word to mark all cells containing that word. This is done by consulting occurrence list 802 for the selected word, and setting a flag for all cells listed in occurrence list 802. System 100 then displays the first marked cell, by consulting page identifier 804 in occurrence list 802. The user can subsequently view other marked cells by invoking a command. Thus, the user can rapidly locate a cell of particular interest based on word content. The user's navigation through the index is essentially identical to navigation through a conventional outline in an outline processor.

Similar techniques may be employed for search by capitalized words or by numbers. Index pages similar to page 1201 are provided, showing capitalized words or numbers, as appropriate, and the user can select words or numbers of interest. As with the text index, the system marks cells containing selected words or numbers, and displays the first marked cell. Thus, the user can rapidly locate a cell of particular interest based on proper word content or number content.

Figure 13:
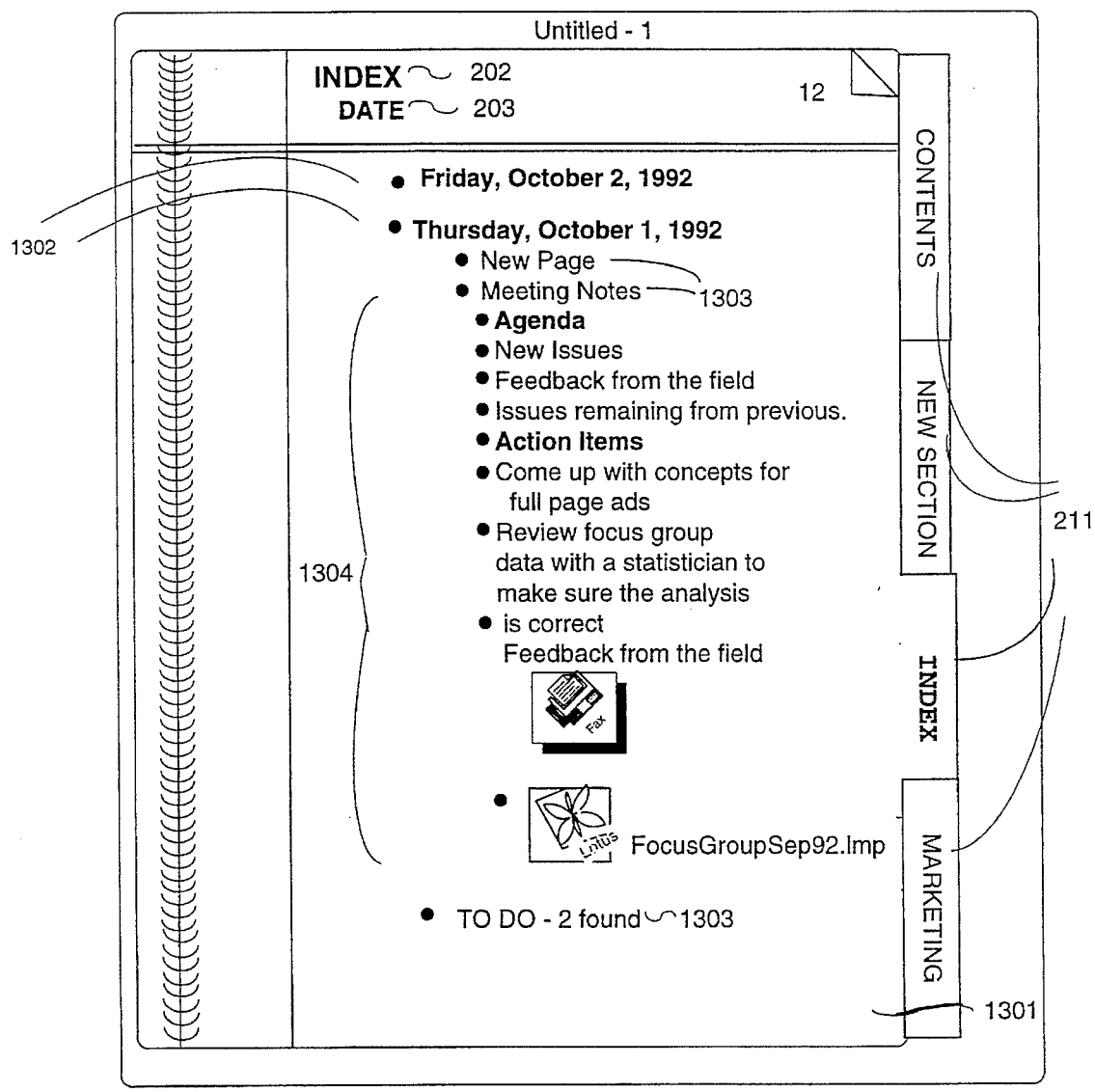
FIG. 13 is an example of an on-screen window including a creation data index page according to the present invention.

The user can also find cells of interest based on an attribute. Referring now to FIG. 13, page 1301 contains creation date cells 1302 corresponding to entries in attribute list 801 of "creation date" data structure 703. Once the user has found a creation date of interest, he or she can double-click on that date cell 1302. When a date cell 1302 is double-clicked, system 100 displays child cells 1303 for that date, showing titles of pages containing cells with the selected date. This is accomplished by consulting occurrence list 802 for the selected date. In the example shown, pages entitled "New Page", "Meeting Notes", and "To Do" are displayed, since all of these pages contain cells with a creation date of Thursday, Oct. 1, 1992. Double-clicking on one of child cells 1303 causes system 100 to display all child cells 1304 on the selected page that contain the selected date. In the example shown, displayed cells 1304 all appear on the page entitled "Meeting Notes" and have a creation date of Thursday, Oct. 1, 1992. Double-clicking on one of child cells 1304 causes system 100 to mark the cell and display the page corresponding to the selected cell. This is done by consulting page identifier 804 in occurrence list 802. Thus, the user can navigate through the notebook based on creation dates of cells. Again, the user's navigation through the index is essentially identical to navigation through a conventional outline in an outline processor.

Figure 14:
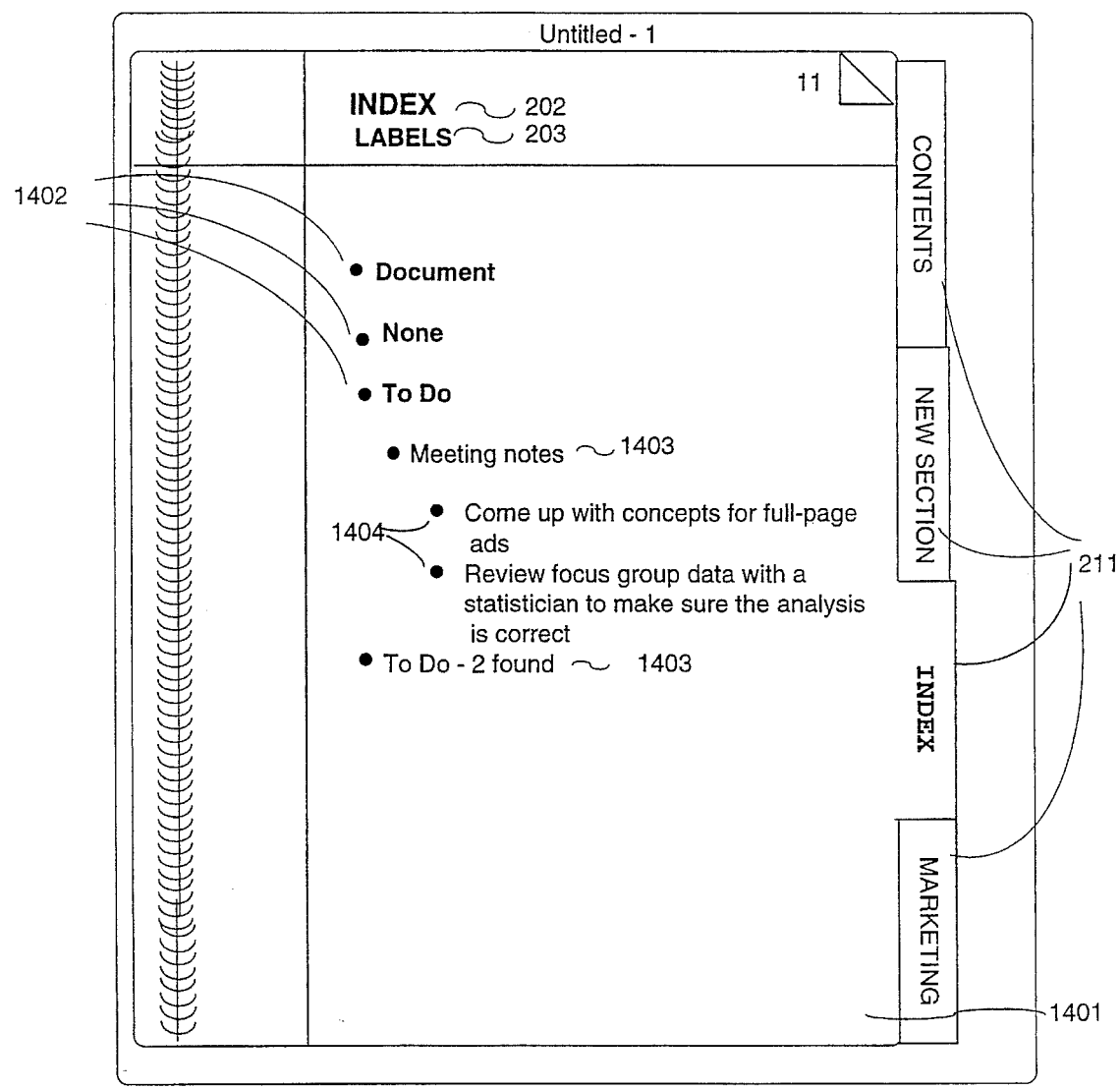
FIG. 14 is an example of an on-screen window including a label index page according to the present invention.

A similar technique is employed for other attributes. For example, FIG. 14 shows page 1401 which contains a label index that operates in a similar manner to the creation date index on page 1301 of FIG. 13. Label cells 1402 are shown, corresponding to entries in attribute list 801 of "label" data structure 702. Child cells 1403 display titles of pages containing cells with a selected label. Child cells 1404 containing the selected label are shown for selected pages, and these cells may be marked if desired by the user.

Therefore, the invention provides a system and method of generating and displaying dynamic index views of information stored in a document. Alternatively, the techniques described herein could be applied to files other than hierarchically-organized notebook files.

What is claimed is:

1. A system for organizing data in a file and for generating and maintaining a dynamic index for the file, comprising:

a storage device for storing a file comprising a plurality of cells containing data elements, each cell having cell attributes;

an index generator, coupled to the storage device, for generating one or more index data structures for storing an index associated with the cells in the file;

an input device coupled to the storage device, for accepting the data for the cells and for accepting inputs representing events associated with the cells;

an event processor, coupled to the input device, for automatically processing events associated with the cells;

means, coupled to the storage device and the event processor, for dynamically updating an index responsive to an event associated with a cell;

an outline processor, coupled to the input device and the storage device, for hierarchically Organizing the cells in the file; and a display device, coupled to the storage device, for selectively displaying the file and an index in a notebook metaphor format.

2. The system of claim 1, wherein the updating means comprises:

means, responsive to a cell event indicating addition of a data element to a cell, for creating in the index a new index entry comprising the data element and the cell;

means, responsive to a cell event indicating modification of a data element in a cell, for removing from the index an index entry corresponding to the data element and the cell, and for creating in the index a new index entry comprising the modified data element and the cell; and means, responsive to a cell event indicating deletion of a data element, for removing from the index an index entry corresponding to the data element and the cell.

3. The system of claim 1, wherein the index structure comprises:

an index item list for storing a plurality of index items; and for each of at least a subset of the index items, an occurrence list comprising a list of the cells in which the index item occurs.

4. The system of claim 3, wherein the index item list is maintained in a b-tree database.

5. The system of claim 3, wherein the index items correspond to data elements in the cells.

6. The system of claim 3, wherein the index items correspond to words in the cells.

7. The system of claim 3, wherein the index items correspond to numbers in the cells.

8. The system of claim 3, wherein the index items correspond to cell attributes.

9. The system of claim 1, wherein the display device selectively displays data elements responsive to user selection from the displayed index.

10. The system of claim 1, wherein events are generated via the input device by a user.

11. The system of claim 1, wherein events are generated via the input device by an on-line network.

12. The system of claim 1, wherein events are generated via the input device by a computer.

13. The system of claim 1 wherein the data contained in the cells are selected from the group consisting of electronic mail messages, documents, faxes, images, video, audio, spreadsheets, and, graphics.

14. A system for organizing and indexing data in a file, comprising:

a storage device for storing a file comprising a plurality of user creatable cells containing data;

an input device, coupled to the storage device, for accepting the data for the cells and for accepting commands for manipulating the data;

an outline processor, coupled to the input device and the storage device, for selectively organizing the cells in hierarchical form;

an event processor, coupled to the input device, for automatically processing events associated with the cells in the file;

an index generator, coupled to the storage device and the event processor, for initializing at least one dynamic index associated with the cells in the file, and for maintaining the index responsive to the events associated with the cells; and an output devices, coupled to the outline processor and the index generator, for selectively displaying the data in the cells and the indexes as a notebook metaphor format.

15. A computer-implemented process for organizing data in a file and for generating a dynamic index for the file, comprising the steps of:

receiving a file comprising a plurality of user creatable cells containing data elements, each cell having cell attributes;

organizing the cells hierarchically;

generating at least one index associated with the cells of the file; accepting an input representing an event on a cell; dynamically updating the index responsive to the event represented by the input; and displaying the file and an index in a notebook metaphor format.

16. The computer-implemented process of claim 15, wherein the event is an addition of a data element to a cell, and the updating step comprises:

storing in the index a new index entry comprising the data element and the cell.

17. The computer-implemented process of claim 15, wherein at least one of the indexes stores index data according to the content of the data elements in the cells.

18. The computer-implemented process of claim 17, wherein the data elements are words.

19. The computer-implemented process of claim 17, wherein the data elements are numbers.

20. The computer-implemented process of claim 16, wherein the step of storing further includes the step of:

determining whether a data element appears in a predefined stop list.

21. The computer-implemented process of claim 15, wherein at least one of the indexes stores index data according to a cell attribute.

22. The computer-implemented process of claim 15, wherein the event is a modification of a data element in a cell, and the updating step comprises the substeps of:

removing from the index an index entry corresponding to the data element and the cell; and storing in the index a new index entry comprising the modified data element and the cell.

23. The computer-implemented process of claim 15, wherein the event is a deletion of a data element in a cell, and the updating step comprises:

removing from the index an index entry corresponding to the data element and the cell.

24. The computer-implemented process of claim 15, wherein the updating step comprises the substeps of:

determining the type of the event;

responsive to the event being an addition of a data element to a cell, storing in the index a new index entry corresponding to the data element and the cell;

responsive to the event being a modification of a data element of a cell, performing the steps of:

removing from the index an index entry corresponding to the data element and the cell; and storing in the index a new index entry corresponding to the data element and the cell; and responsive to the event being a deletion of a data element from a cell, removing from the index an index entry corresponding to the data element and the cell.

25. The process of claim 15 wherein the data elements contained in the cells are selected from the group consisting of electronic mail messages, documents, faxes, images, video, audio, spreadsheets, and, graphics.

26. The computer-implemented process of claim 15 further comprising the step of:

responsive to user input, selectively displaying one or more cells corresponding to a selected index entry.

27. A computer-implemented process for generating a dynamic index for a file, the file comprising a plurality of user creatable cells containing data, comprising the steps of:

(a) initializing at least one index associated with the cells;

(b) accepting an input representing an event on a cell;

(c) determining the type of the event;

(d) responsive to the event being an addition of data to a cell, storing in the index a new index entry corresponding to the cell;

(e) responsive to the event being a modification of a cell, performing the steps of:
  (e.1) removing from the index an index entry corresponding to the cell; and
  (e.2) storing in the index a new index entry corresponding to the cell;

(f) responsive to the event being a deletion of data from a cell, removing from the index an index entry corresponding to the cell;

(g) selectively displaying a representation of a selected index; and (h) responsive to user input, selectively displaying one or more cells corresponding to a selected index entry.

* * * * *